United States Patent [19]
Natter

[11] Patent Number: 5,846,272
[45] Date of Patent: Dec. 8, 1998

[54] EQUIPMENT FOR PRECIPITATION OF POLLUTANTS FROM THE OFF-GAS OF A POLLUTANT SOURCE, PARTICULARLY OF A TENTERING FRAME

[75] Inventor: Arthur Natter, Wolfurt, Austria

[73] Assignee: Koenig AG, Amriswil, Switzerland

[21] Appl. No.: 592,476

[22] Filed: Jan. 26, 1996

[30] Foreign Application Priority Data

Jan. 26, 1995 [CH] Switzerland ................ 212/95

[51] Int. Cl.⁶ .................................. B01D 50/00
[52] U.S. Cl. .................. 55/315.2; 55/318; 96/243; 96/355
[58] Field of Search ................ 55/222, 223, 229, 55/235, 237, 238, 257.3, 257.7, 269, 318

[56] References Cited

U.S. PATENT DOCUMENTS

| | | | |
|---|---|---|---|
| 2,128,245 | 8/1938 | Hager | 55/222 |
| 3,572,010 | 3/1971 | Dupps, Sr. | 55/222 |
| 4,068,709 | 1/1978 | Schraud et al. | 55/222 |
| 4,126,431 | 11/1978 | Wolowski et al. | 55/222 |
| 4,600,561 | 7/1986 | Frei | 55/222 |
| 5,364,599 | 11/1994 | Lee | 55/222 |
| 5,534,230 | 7/1996 | Johnson et al. | 55/222 |

FOREIGN PATENT DOCUMENTS

| | | | |
|---|---|---|---|
| 334922B1 | 9/1988 | European Pat. Off. . | |
| 665028 | 5/1931 | France | 55/222 |
| 55-33923 | 9/1980 | Japan | 55/222 |
| 120072 | 8/1926 | Switzerland | 55/222 |
| 1443948 | 9/1988 | U.S.S.R. | 55/222 |

*Primary Examiner*—C. Scott Bushey
*Attorney, Agent, or Firm*—Sughrue, Mion, Zinn, Macpeak & Seas, PLLC

[57] ABSTRACT

A system for precipitation of pollutants from an off-gas, wherein the off-gas is cooled in a smooth-tube heat exchanger (13). The off-gas flows through a bundle of tubes (19) which extend vertically or tilted inside the heat exchanger. Cold water is introduced at a secondary side connection (43) of the heat exchanger (13). An air stripper (36) and a mist eliminator (26), and an optional electrostatic filter (27), are installed downstream of the heat exchanger (13). In the heat exchanger (13) and the air stripper (36), a portion of the condensable pollutants condenses out and a portion of the water-solubles and solids are precipitated. The system can be cleaned automatically and requires only a small placement area.

6 Claims, 3 Drawing Sheets

EQUIPMENT FOR PRECIPITATION OF POLLUTANTS FROM THE OFF-GAS OF A POLLUTANT SOURCE, PARTICULARLY OF A TENTERING FRAME

BACKGROUND OF THE INVENTION

A system for precipitation of pollutants from the off-gas of a tentering frame is known from EP-B-334 922. The off-gas is cooled over two finned heat exchangers which use fresh air or water on the secondary side. The condensed portions are precipitated in a mist eliminator. Finally, the cooled off-gas is drawn through filter mats. The finned heat exchanger of this system is relatively difficult to clean.

SUMMARY OF THE INVENTION

The objective of this invention is to provide a system of the above type which is maintenance-free. This objective is met by constructing the heat exchanger as a smooth-tube heat exchanger with the off-gas flowing inside the tubes, so that these tubes can be very easily cleaned. In addition, since the wall temperature on the off-gas side in a smooth-tube heat exchanger is lower than the fin temperature of a finned heat exchanger with the same cooling medium, more condensable pollutants can be condensed out. With the vertical or tilted arrangement of the heat exchanger, the placement area requirement is small.

BRIEF DESCRIPTION OF THE DRAWING FIGURES

A preferred embodiment of the invention is described below with respect to the following figures.

DETAILED DESCRIPTION OF THE PREFERRED EMBODIMENTS

Figure 1:
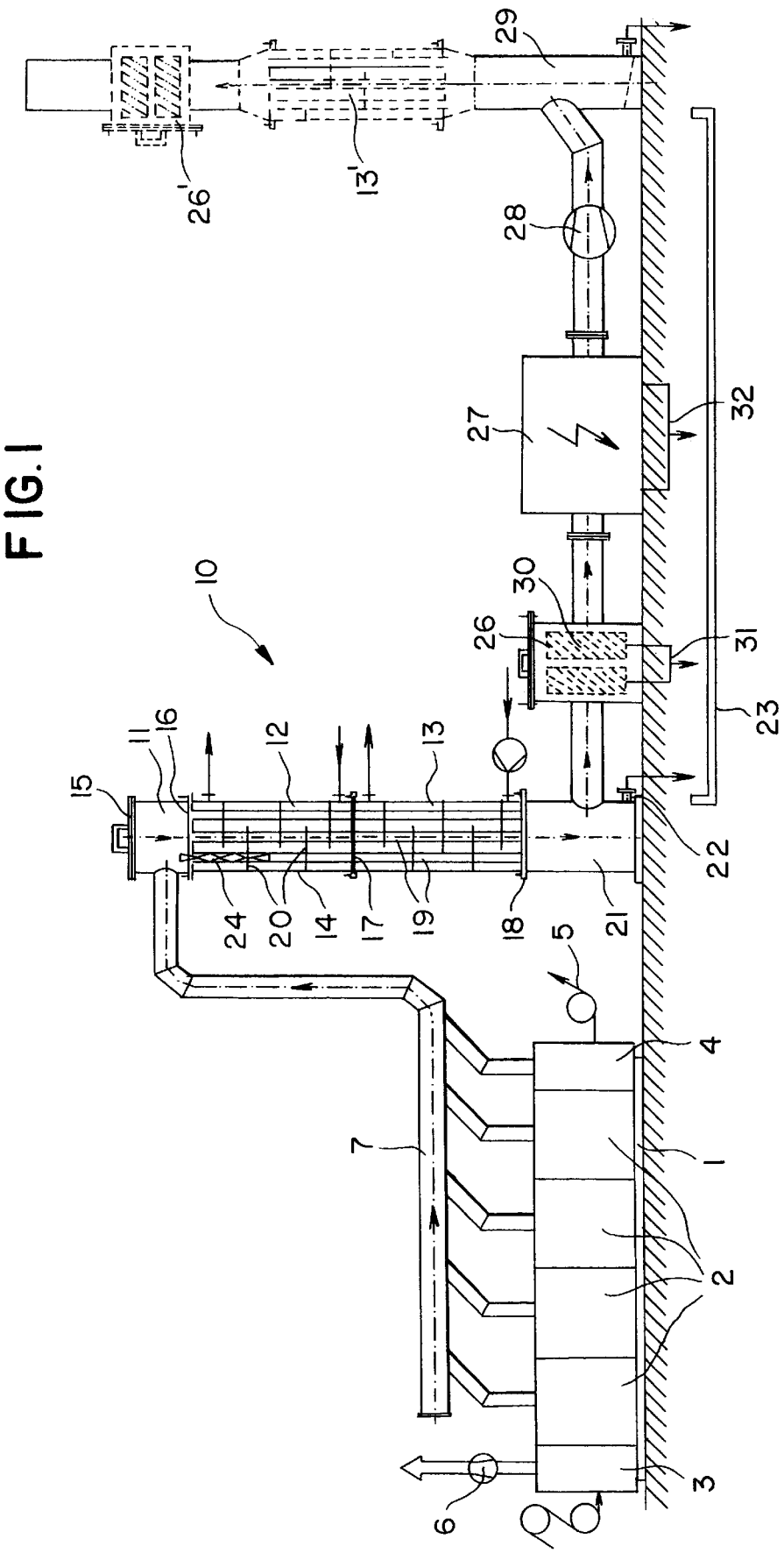
FIG. 1 is a schematic of a first embodiment of the invention.

The invention is shown in FIG. 1 in combination with a tentering frame 1, shown only schematically. The tentering frame 1 has multiple fields 2, 3, through which a material train 5 is carried out, for example, for drying or for heat setting. The off-gas of the leading field 3 is only minimally loaded with pollutants and is fed directly to the atmosphere with a fan 6. The off-gas of the other fields 2, at a temperature of, for example, 150° C. to 180° C., is suctioned off over a main header 7 by system 10.

The header 7 is connected to an entrance chamber 11 at the upper end of two smooth-tube heat exchangers 12, 13 connected in series. The heat exchangers 12, 13 have a common, tubular, vertical or tilted housing 14, which is closed on top by a removable cover 15. The housing 14 has an upper, a middle and a lower separating wall 16, 17, 18. Smooth tubes 19 are welded into the separating walls 16–18 and pass through both heat exchangers 12, 13. These tubes carry the off-gas on the inside. The inside of the tubes 19 is polished. Baffle plates 20 are arranged between the separating walls 16–18 so that the cooling medium flows around the tubes 19 on the outside in a meandering fashion upward from the bottom. Additionally, static mixers 24, i.e., spirally wound fins, can be inserted in the tubes in order to increase turbulence of the off-gas in the tubes and thus the heat transfer. The static mixers 24 also have the effect of forcing the off-gas into a helical path, wherein a certain centrifugal effect, and thus an improved precipitation of condensate and solids, is achieved at the tube walls.

The upper heat exchanger 12 is an air-air heat exchanger in which fresh air, for example, for the tentering frame 1, is heated to approximately 120° C., for example. In this way, the energy requirement of the tentering frame 1 is reduced. In the lower heat exchanger 13, cold water is pumped in from below, and is heated to approximately 30° C. Through the combination of the two heat exchangers 12, 13, the off-gas is cooled to approximately 45° C. A considerable portion of the condensable pollutants of the off-gas condense out in the process. If the off-gas is moist, a water film forms on the tube wall as well as fog mainly in the lower heat exchanger 13. Water soluble components of the pollutants, for example, formaldehyde and glycols, are partially dissolved by absorption into this water.

Since the tubes are vertical or tilted, the condensate flows downward in the tubes 19, with the help of the air stream, into the exit chamber 21, where it is fed by connection 22 to a collection basin 23.

The off-gas is suctioned from the exit chamber 21 over a mist eliminator 26 and an electrostatic filter 27 through a fan 28, and fed to a flue 29. The mist eliminator 26 has fins 30 with vertical re-directing edges in which entrained fluid droplets are coalesced and likewise directed to the basin 23 through connector 31. The finest particles and aerosol droplets precipitated in the electrostatic filter 27 are fed to the basin 23 over a connector 32. With the combination of the heat exchangers 12, 13, the mist eliminator 26 and the electrostatic filter 27, an overall degree of precipitation of about 90% relative to the aerosols is reached. With lesser requirements, the electrostatic filter 27 can also be left out, i.e., not used.

The heat exchangers 12, 13 can thus be automatically cleaned by emptying the water from the lower heat exchanger 13 and shutting off the air flow through the upper heat exchanger 12 on the secondary side. The hot tentering off-gas of, for example, 150° C. to 200° C., then heats the two heat exchangers 12, 13 and the mist eliminator 26 quickly to a temperature at which fatty layers in the tubes 19 and on the fins 30 are melted away. The high air velocity with in the heat exchangers 12, 13 and the fins 30 aids in the cleaning effect.

Water can also be incorporated as a cooling medium in the first heat exchanger 12, instead of air, for example preheated process water. If necessary, one of the heat exchangers 12 or 13 can also be eliminated. Another smooth tube heat exchanger 13', as a mixed vapor-air precipitator and another mist eliminator 26' connected downstream can be built into the flue 29, as shown by the dotted line in FIG. 1. Cold water or cold air can be employed as the cooling medium in this heat exchanger 13', wherein the heated cold air could be employed for heating purposes.

The above variation is particularly advantageous if the off-gas in the first two heat exchangers 12, 13 (or in the individual heat exchanger 12 or 13) is not cooled below the dew point. In this case aerosols and condensable pollutants are precipitated primarily in the heat exchangers 12, 13 and in the electrostatic filter 27, but rarely water. Since the off-gas in the electrostatic filter 27 is not saturated with water vapor, the operation of this filter 27 is safer. The pollutants precipitated out in the heat exchangers 12, 13 and in the electrostatic filter 27 are mostly oil-containing and are disposed of as miscellaneous waste. It is desirable that the volume of these pollutants is small.

In the mixed vapor-air precipitator 13', the off-gas is cooled to a temperature considerably below the dew point. The off-gas side wall temperatures are from 15° C. to 30° C. A water film thus forms on the inner walls of the tubes 19 of this condenser 13' and fog droplets form in the off-gas. The condenser 13' thus has a washing effect similar to a stripper with water-trickled packing. In contrast to such a packed stripper, which tends to get plugged, the smooth tube heat exchanger 13' is very easy to maintain. For example, the automatic cleaning process described above can be applied. The water condensed in the condenser 13' dissolves the water-soluble pollutants out of the off-gas for the most part due to the washing effect. Since these pollutants are not oil-containing, the wastewater contamination is minimal so that the condensate precipitated in the condenser 13' and on the mist eliminator 26' can be fed directly to the sewer system. The miscellaneous waste can then be held to a minimum.

The off-gas exiting from the precipitator 26' has a minimal water vapor content. Water vapor typically carries an odor. By precipitating a significant portion of the water vapor, the odor is also minimized. This cannot be achieved with conventional strippers, since they are mainly operated at temperatures above 45° C. As noted above, with lesser requirements, the electrostatic filter 27 can also be left out, i.e., not used.

The embodiment shown in FIG. 2 differs from that according to FIG. 1 in that only a single heat exchanger 13 is provided, and in the same housing 14 below the heat exchanger 13, an air stripper 36 is provided. The air stripper 36 has a plurality of spray nozzles 37 which receive wastewater over line 38. Water soluble components of the pollutants of the off-gas dissolve through the finely sprayed wastewater in the air stripper 36. Further, solids, for example lint, are washed out. Only minimally contaminated wastewater is fed to the sewer system over the line 38. The air stripper 36 has a removable viewing window 39 with an illuminator 40 for monitoring and for cleaning purposes.

In the mist eliminator 26, additional spray nozzles 41 are provided and directed against the fins 30 and supplied periodically over line 42 with fresh water in order to clean off any contamination clinging to the fins.

The heat exchanger 13 has a connector 43 for cold water at the bottom. Additionally, it can have another connector 44 in the middle for feeding warmer water.

Figure 2:
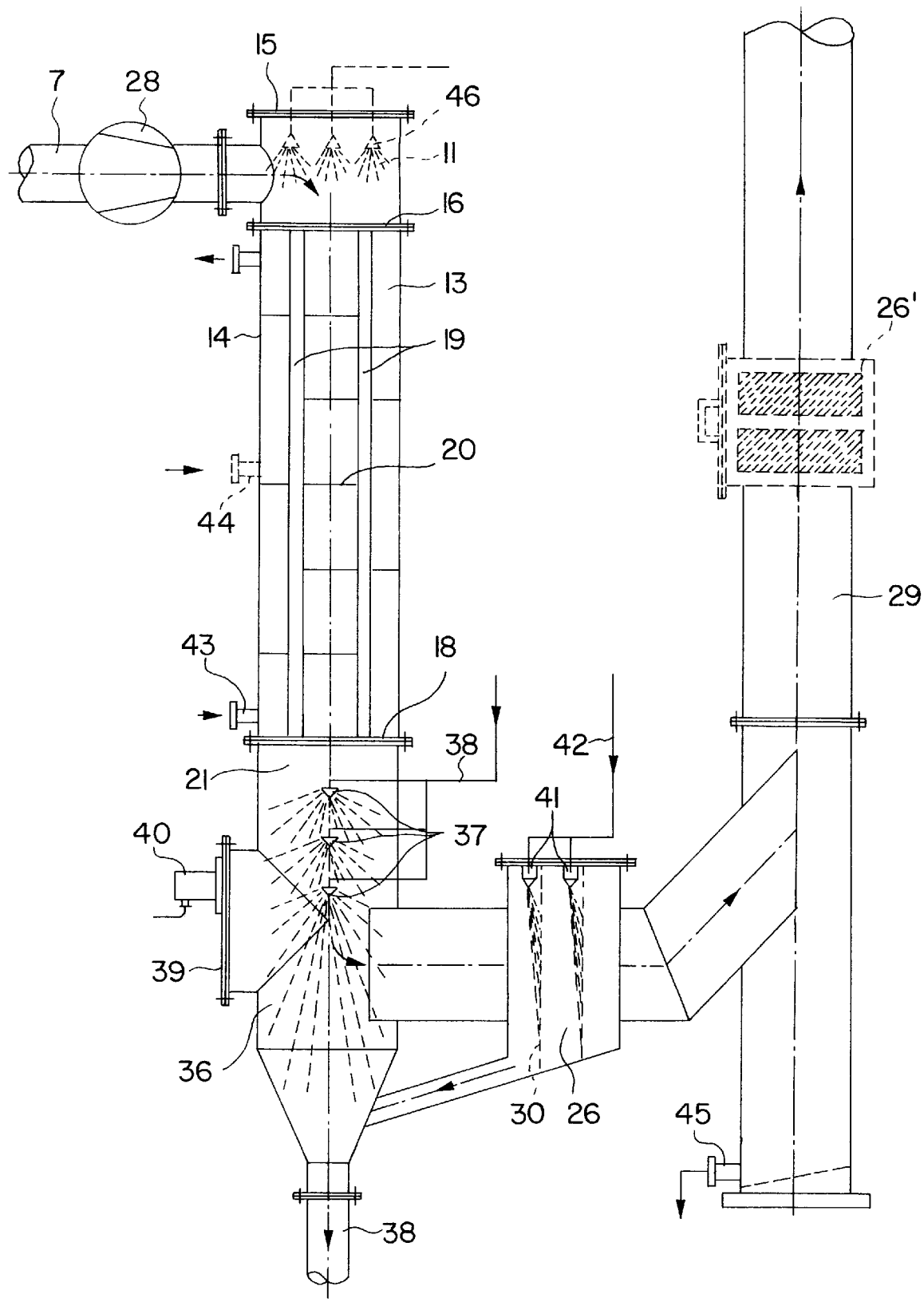
FIG. 2 is a schematic of a second embodiment of the invention.

In order to extend the residence time of the water droplets sprayed in, the mist eliminator 26 can be arranged in flue 29, as shown by the dotted lines identified by reference number 26' in FIG. 2, instead of being directly adjacent to the air stripper 36. Likewise, flue 29 has a connector 45 on the bottom for draw-off of condensate.

Instead of, or in addition to, the air stripper 36 connected downstream of the heat exchanger 13, a water atomizer can be arranged in the inlet chamber 11 or a chamber connected upstream to this, in which fresh water is finely atomized in hollow sphere nozzles 46. This variation is illustrated in FIG. 2 with dotted lines. The off-gas is thus saturated with water vapor before entrance into the heat exchanger 13. This water vapor again partially re-condenses in the heat exchanger. Because of the relatively long residence time up to the mist eliminator 26, the water soluble components of the pollutants of the off-gas are partially absorbed in the condensed water. The cleaning effect can thus be further improved. This variation is most desirable in those cases where the recovered heat is not utilized or is only utilized with difficulty.

Figure 3:
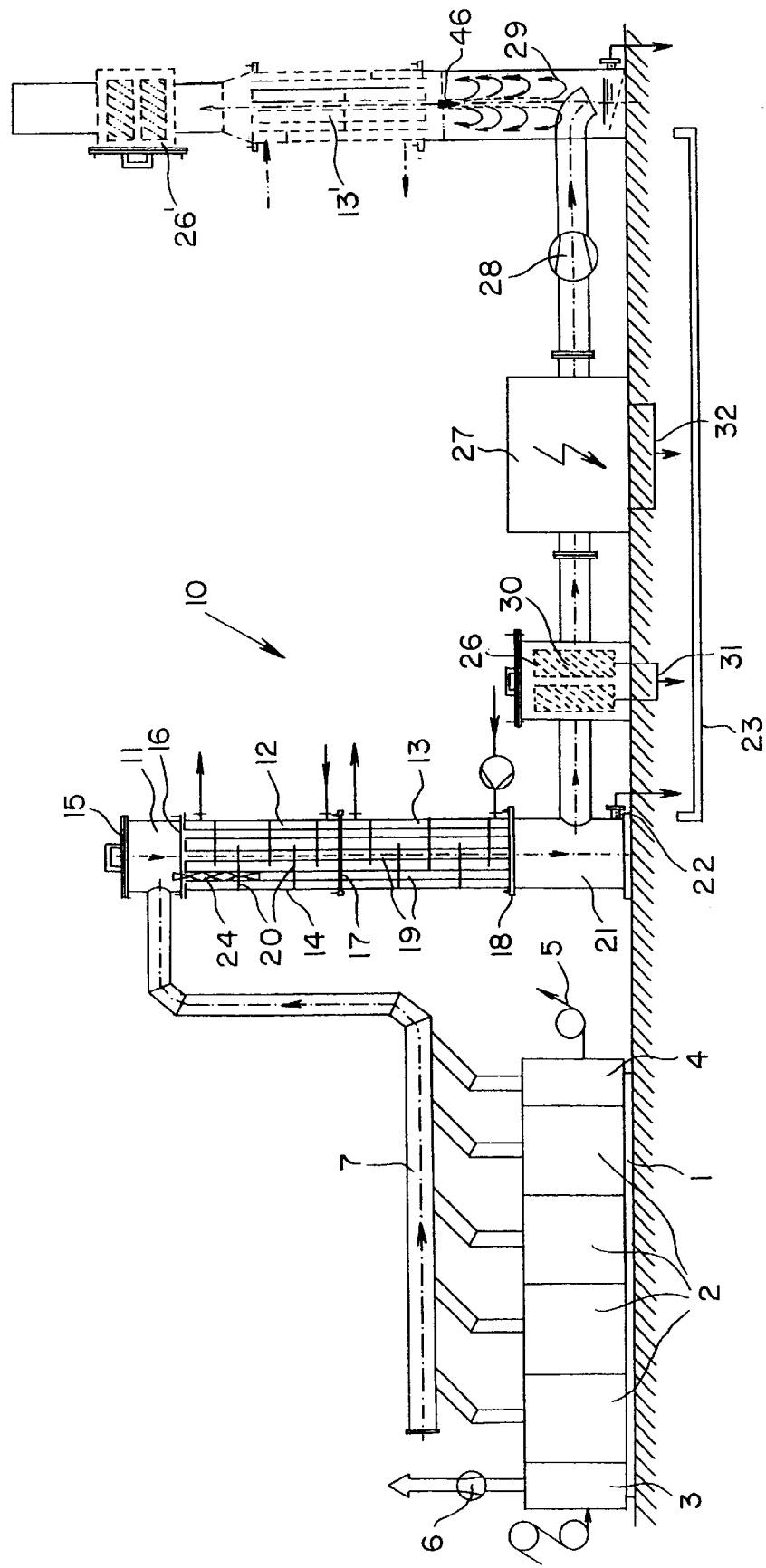
FIG. 3 is a variation of the embodiment according to FIG. 1.

The water atomizer with the spray nozzles 46 can also be effectively employed as a spray condenser in the embodiment shown in FIG. 1, upstream of the mixed vapor-air condenser 13', if the off-gas is relatively dry but contains water soluble components. This variation is represented in FIG. 3. The spray nozzles 46 include numerous concentrically arranged injection nozzles for fine atomization of the fresh water. They spray downward against the off-gas stream. The water droplets are turned around by the air stream and are entrained into the mixed vapor-air condenser 13'. The fine water droplets result in a large water surface area. In this way, water soluble substances are brought into solution efficiently. The off-gas is saturated with water vapor prior to the condenser 13'. The water droplets carried along in the airstream approach the boundary layer region of the cold condenser tube again and again by the turbulent current of the steam-air mixture in condenser 13'. These droplets are then cooled below the temperature of the core current so that water vapor condenses on the droplet surfaces. By the combination surface condenser with pre-installed injection condenser, a very high condenser performance is attained so that practically no vapor trail emerges from the flue 29.

The condensate arising in the flue 29, in the condenser 13' and in the mist eliminator 26' is mainly water with water soluble components and contains practically no oil. It can thus be fed to the sewer system and need not be disposed of as miscellaneous waste. Consequently, it is not fed to the basin 23. Disposal costs are therefore reduced.

What is claimed is:

1. A system for precipitation of pollutants from the off-gas of a pollution source (1), comprising:

a smooth tube heat exchanger (13) including:

a bundle of smooth, non-ribbed tubes (19) disposed vertically or at an angle inside said heat exchanger, the off-gas passing through said tubes, said tubes opening into an entrance chamber (11) at a top of said heat exchanger and an exit chamber (21) at a bottom of said heat exchanger;

an entrance connector disposed adjacent to the exit chamber (21) for introducing a cooling medium into said heat exchanger, said cooling medium flowing in an annular region between said tubes and an inner wall of said heat exchanger; and an exit connector through which the cooling medium exits said heat exchanger;

a mist eliminator (26) disposed downstream of said heat exchanger (13); and an off-gas stripper (36) disposed below said heat exchanger (13) and upstream of said mist eliminator (26).

2. A system according to claim 1, wherein the cooling medium is one of cold water and cold air.

3. A system according to claim 1, wherein said off-gas stripper (36) and said heat exchanger (13) have a common, tubular shaped housing (14).

4. A system according to claim 1, wherein inner wall surfaces of said tubes (19) are polished.

5. A system according to claim 1, further comprising static mixers (24) disposed inside said tubes (19).

6. A system according to claim 1, further comprising a water atomizer (46) disposed upstream of said heat exchanger (13) for saturating the off-gas with water vapor.

\* \* \* \* \*